United States Patent
Miao et al.

(10) Patent No.: US 9,092,561 B2
(45) Date of Patent: Jul. 28, 2015

(54) MODEL CHECKING FOR DISTRIBUTED APPLICATION VALIDATION

(75) Inventors: Lidan Miao, Issaquah, WA (US); Peng Song, Issaquah, WA (US); Li Zhang, Sammamish, WA (US); Mihail G. Tarta, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 892 days.

(21) Appl. No.: 12/908,007

(22) Filed: Oct. 20, 2010

(65) Prior Publication Data
US 2012/0101800 A1   Apr. 26, 2012

(51) Int. Cl.
G06F 11/36   (2006.01)
G06F 11/34   (2006.01)

(52) U.S. Cl.
CPC ........ *G06F 11/3612* (2013.01); *G06F 11/3608* (2013.01); *G06F 11/3692* (2013.01); *G06F 11/3447* (2013.01); *G06F 11/3476* (2013.01)

(58) Field of Classification Search
None
See application file for complete search history.

(56) References Cited

U.S. PATENT DOCUMENTS

| | | | | |
|---|---|---|---|---|
| 5,960,199 A * | 9/1999 | Brodsky et al. | | 717/128 |
| 6,941,362 B2 * | 9/2005 | Barkai et al. | | 709/223 |
| 7,058,958 B1 * | 6/2006 | Shutt et al. | | 719/328 |
| 7,096,459 B2 * | 8/2006 | Keller et al. | | 717/124 |
| 7,490,317 B1 * | 2/2009 | Hahn et al. | | 717/121 |
| 7,770,153 B2 * | 8/2010 | Chilimbi et al. | | 717/127 |
| 7,996,814 B1 * | 8/2011 | Qureshi et al. | | 717/120 |
| 8,001,527 B1 * | 8/2011 | Qureshi et al. | | 717/120 |
| 8,032,866 B1 * | 10/2011 | Golender et al. | | 717/128 |
| 8,364,775 B2 * | 1/2013 | Deshmukh et al. | | 709/208 |
| 2007/0028220 A1 * | 2/2007 | Miller et al. | | 717/124 |
| 2008/0016115 A1 * | 1/2008 | Bahl et al. | | 707/104.1 |
| 2008/0276253 A1 * | 11/2008 | Khandrika et al. | | 719/318 |
| 2009/0113380 A1 * | 4/2009 | Ploesser et al. | | 717/104 |
| 2010/0011057 A1 | 1/2010 | Ganai | | |
| 2010/0125758 A1 * | 5/2010 | Yang et al. | | 714/45 |
| 2010/0218031 A1 * | 8/2010 | Agarwal et al. | | 714/2 |
| 2010/0262858 A1 * | 10/2010 | Chen et al. | | 714/2 |
| 2010/0306732 A1 * | 12/2010 | Zhu | | 717/105 |

(Continued)

OTHER PUBLICATIONS

Reynolds, P. Killian, C., Wiener, J. L., Mogul, J. C., Shah, M. A., & Vahdat, A. (May 2006). Pip: Detecting the unexpected in distributed systems. In Proceedings of the 3rd conference on Networked Systems Design & Implementation (vol. 3, p. 9).*

(Continued)

*Primary Examiner* — Matthew Brophy
(74) *Attorney, Agent, or Firm* — Aneesh Mehta; Kate Drakos; Micky Minhas (57) ABSTRACT

A model checking system is described herein that more effectively verifies and validates the design of distributed applications by providing a model and a generic framework to check application invariant properties, detect anomaly behaviors, and monitor application health. The model checking system checks on-line application behavior against application models derived from formal descriptions of the application. The system formulates the concrete application as an abstract model and a number of rules or properties that are expected to hold for the application under all conditions. The model checker compares the actual application execution with the models and either confirms that the properties hold true or reports that the properties are violated. Thus, the model checking system provides more efficient and thorough validation of distributed applications under more realistic production conditions.

19 Claims, 3 Drawing Sheets

(56) References Cited

U.S. PATENT DOCUMENTS

| | | | |
|---|---|---|---|
| 2011/0016356 A1* | 1/2011 | Artzi et al. | 714/38 |
| 2011/0078666 A1* | 3/2011 | Altekar | 717/131 |
| 2011/0083123 A1* | 4/2011 | Lou et al. | 717/125 |
| 2011/0197180 A1* | 8/2011 | Huang et al. | 717/126 |

OTHER PUBLICATIONS

Liu, X., Guo, Z., Wang, X., Chen, F., Lian, X., Tang, J., . . . & Zhang, Z. (Apr. 2008). D3S: Debugging deployed distributed systems. In Proceedings of the 5th USENIX Symposium on Networked Systems Design and Implementation (pp. 423-437). USENIX Association.*

Liu, X., Lin, W., Pan, A., & Zhang, Z. (Apr. 2007). Wids checker: Combating bugs in distributed systems. In Networked Systems Design and Implementation (NSDI).*

Geels, D., Altekar, G., Maniatis, P., Roscoe, T., & Stoica, I. (Apr. 2007). Friday: Global comprehension for distributed replay. In Proceedings of the Fourth Symposium on Networked Systems Design and Implementation (NASI'07).*

Jiang, Miao, et al. "Detection and diagnosis of recurrent faults in software systems by invariant analysis." High Assurance Systems Engineering Symposium, 2008. HASE 2008. 11th IEEE. IEEE, 2008.*

Munawar, Mohammad Ahmad, Michael Jiang, and Paul AS Ward. "Monitoring multi-tier clustered systems with invariant metric relationships." Proceedings of the 2008 international workshop on Software engineering for adaptive and self-managing systems. ACM, 2008.*

Ku, Kelvin, "Software Model-Checking: Benchmarking and Techniques for Buffer Overflow Analysis", Retrieved at << http://www.cs.toronto.edu/~chechik/pubs/kelvinthesis.pdf >>, 2008, pp. 108.

Holzmann, Gerard J., "The Model Checker Spin", Retrieved at << http://citeseerx.ist.psu.edu/viewdoc/download?doi=10.1.1.134.7596&rep=rep1&type=pdf >>, IEEE Transactions on Software Engineering, vol. 23, No. 5, May 1997, p. 1-17.

Anderson, et al., "Model Checking Large Software Specifications", Retrieved at << http://www.cs.washington.edu/homes/beame/papers/fse.pdf >>, In the proceedings of ACM SIGSOFT Software Engineering Notes, vol. 21 , Issue 6 (Nov. 1996), p. 156-166.

Pingree, et al., "Validation of mission critical software design and Implementation using model checking", Retrieved at << http://trs-new.jpl.nasa.gov/dspace/bitstream/2014/9772/1/02-1911.pdf >>, Digital Avionics Systems Conference, Proceedings. The 21st, vol. 1, Oct. 27-31, 2002, p. 1-12.

Bogunovic, et al., "A Synthesized Framework for Formal Verification of Computing Systems", Retrieved at << http://www.iiisci.org/journal/CV$/sci/pdfs/P976436.pdf >>, Systemics, Cybernetics and Informatics, vol. 1, No. 6, p. 18-23.

\* cited by examiner

MODEL CHECKING FOR DISTRIBUTED APPLICATION VALIDATION

BACKGROUND

The complexity of distributed systems and their testing mechanisms have been widely explored for many years. There are many challenges inherent in distributed systems, such as latency of asynchronous communications, error recovery, clock drift, and service partitioning, leading to numerous problems including deadlocks, race conditions, and many other difficulties. Testing of such complex systems presents big challenges. Over the years, many automatic test generation, deployment, and execution methods have been investigated and implemented. However, great efforts are still demanded in the area of automatic system validation and verification.

Due to the complexity of event sequence control and test scenario explosion as the system scale increases, most testing methodologies are random using the model-based approach. In such cases, the verification cannot be coupled with particular actions and faults. Typical current models construct the graph of the states a distributed system could reach then conduct brute force verification, which results in state space explosion and difficulties in the high-level system abstraction. One example of a large distributed system is MICROSOFT™ SQL Azure. SQL Azure provides a cloud-based storage service that can store large amounts of data on a variety of actual physical hardware in distributed data centers. SQL Azure is a huge distributed system. In addition, the system scale dynamically changes in order to provide elastic storage.

Not only development but also testing of such a system is presented with great challenges. Traditional testing approaches might test functionality on one physical computer and rely on failure injection to test failover and long haul tools to introduce loads to the system. Tests can then check if the distributed system is healthy without errors, no partitions in abnormal states, no nodes that are down, and so forth. Investigating issues on a distributed system is a non-trivial process. When issues happen on the distributed system, the investigation involves specific domain expertise and knowledge. Too many traces may involve correlation and long investigation. Currently, event correlation is conducted manually which involves the correlation of a set of history tables. Without knowing the details of the related system components, it is difficult to track down a problem to the root cause. Monitoring of distributed system health is also a largely manual process. Limited auto-monitoring can check some factors, such as availability, service switch, and watchdog errors, but a person only checks other large amounts of metrics if something goes wrong; otherwise, the information is simply logged and ignored. In addition, some abnormal behaviors may not manifest themselves as or lead to obvious application errors, or may not be persisted in the way that auto-monitoring needs. Typical examples are in-memory states, unnecessary state transitions due to stale triggering events, and transient healthy state that could be ignored by manual checks.

SUMMARY

A model checking system is described herein that effectively verifies and validates the design of distributed applications by providing a model and a generic framework to check application invariant properties, detect anomaly behaviors, and monitor application health. The properties verified by the model checker apply to single entities in the system, to groups of many entities in the system, and to the system as a whole. The model checking system checks on-line application behavior against application models derived from formal descriptions of the application, referred to as model checking. The system formulates the concrete application as an abstract model and a number of rules or properties that are expected to hold for the application under all conditions. There are four types of invariant properties including: Safety—always true at any point in the system; Liveness—eventually true in the system after faults quiesce; Fairness—there are no system executions that always ignore certain applicable transitions; and Stable—true always after some point in time. The model checker compares the actual application execution with the models and either confirms that the properties hold true or reports that the properties are violated. A generic framework is implemented where various verification and validation activities can be conducted synchronously.

The model checking system models the target distributed application as a collection of small finite state machines and a dependency graph to capture the correlation between components. In some embodiments, the correlation keys used by the model checker do not rely on physical clock time on the machines where the distributed application runs. The system automatically conducts root cause analysis based on the event dependency graph. Even if a failure involves multiple machines, components, and logs, the system can correlate the entire sequence of events to track a problem from the operation that caused the problem all the way through the contributing action of each component. Thus, the model checking system provides an efficient and thorough validation of distributed applications under more realistic production conditions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A model checking system is described herein that more effectively verifies and validates the design of distributed applications by providing a model and a generic framework to check application invariant properties, detect anomaly behaviors, and monitor application health. The model checking system checks online application behavior against application models derived from formal descriptions of the application, referred to as model checking. The system formulates the concrete application as an abstract model and a number of rules or properties that are expected to hold for the application under all conditions. The model checker compares the actual application execution with the models and either confirms that the properties hold true or reports that the properties are violated.

Compared to existing model checking methods, the model checking system described herein does not suffer from the problems of state space explosion and difficulties in the high-level system abstraction. In this system, the application models are adequately selected aspects of the application behavior and described in an easy and straightforward way. The system has the flexibility of scaling out and scaling up. In addition, the system provides functionality to trace down root causes for error analysis, which saves tremendous amount of time for human investigation. A generic framework is implemented where various verification and validation activities can be conducted synchronously or asynchronously. The framework is easy to extend for application-specific models, their corresponding behavior providers, and model checkers.

The model checking system models the target distributed application as a collection of small finite state machines and a dependency graph to capture the correlation between components. The system automatically conducts root cause analysis based on the event dependency graph. Even if a failure involves multiple machines, components, and logs, the system can correlate the entire sequence of events to track a problem from the operation that caused the problem all the way through the contributing action of each component. The system also provides a generic framework to allow various validation methods in addition to finite state machines that can be added by application developers for further testing of their distributed applications. Thus, the model checking system provides more efficient and thorough validation of distributed applications under realistic production conditions.

The following paragraphs describe the model checking system in further detail, presenting a model checking mechanism to validate and verify behaviors of distributed applications by using the proposed framework. Building models uses certain domain knowledge to define and build up the models, and it provides more flexibility to incorporate new features, discard old features, determine what behaviors to check, and how many details to investigate. This mechanism helps to gain confidence in the soundness of large-scale applications, reduce the error investigation time, and perform detailed verification in a more cost-effective way. In addition, the framework allows easy extension to other applications.

Models

Model checking is a process of automatic analysis of reactive systems based on a set of abstracted rules or invariant properties. It has the ability to detect erroneous behaviors as soon as errors occur at some observable output levels. This has the potential of identifying timing problems at an early stage when correction is less expensive than a late stage discovery, and preventing disastrous failures, which presents great value in a production environment. In some embodiments, the model checking system relies upon system behaviors eventually being represented as certain types of log files. Such logs can faithfully capture all the relevant application behavior including application state transitions, errors, and performance metrics. In some embodiments, logs of the distributed system are aggregated into a central store to facilitate failure investigation. The modelchecking engine does not rely on a centralized trace store as long as a corresponding log reader is provided. Inside the engine, the work is done by the collaboration of several management components and their workers.

The models are some invariant properties of the target application to be analyzed. To illustrate the framework, consider the following three types of models:—finite state machines (FSMs), errors, and performance metrics—as examples, but they are not limited to the ones discussed here.

The first type of model is a finite state machine model. To avoid the complexity of model abstraction and the state space explosion problem, the system focuses on the FSMs running on individual machines. The relationship among FSMs is captured by correlating events on different machines. In other words, the application behavior is transformed into a collection of small FSMs and an event dependency graph. Both variables are invariant to the size of the distributed application. The system defines each of the states as one of the following types: Start (entry point of FSM), Normal (any acceptable state except final), and Final (no event can trigger transition from this state). For Start and Normal states, certain statistic information of the state lifetime is collected during the learning phase, which will then be used to perform verifications. A typical state machine and its model description follow.

```
<FsmModel Name="MyModelName">
 <States>
  <State Name="S1" Type="Start" />
  <State Name="S2" Type="Normal" />
  <State Name="S3" Type="Normal" />
  <State Name="S4" Type="Final" />
 </States>
 <Transitions>
  <Transition From="S1" To="S2">
   <Statistics>
    <StatisticItem Type="Max" Value="2.60" />
    <StatisticItem Type="Min" Value="0.17" />
    <StatisticItem Type="Avg" Value="1.74" />
    <StatisticItem Type="Var" Value="1.91" />
   </Statistics>
  </Transition>
  <Transition From="S2" To="S3">
   <Statistics/>
  </Transition>
  <Transition From="S3" To="S2">
   <Statistics/>
  </Transition>
  <Transition From="S2" To="S4">
   <Statistics/>
  </Transition>
 </Transitions>
</FsmModel>
```

The second type of model is an error invariant model. Error invariant is one of the stable properties of distributed applications, which can be described as no deadlocks, no unhandled exceptions, no assertions, and so forth. The system may also check other non-fatal errors to correlate with other failures or normal behaviors. Most distributed applications have the ability of self-recovering. Due to timing issues, some errors that could be ignored might trigger large-scale failures if the sequence of events changes. The automatic monitoring of such errors becomes very helpful to avoid cascading failures. A sample error model follows.

```
<ErrorModel Name="MyModelName" >
 <ErrorItem Type="" Level="">
  <MatchingCriteria>
   <Criterion Field="" Keys="" Regex="" Match="" Basevalue=""
    DataType="" />
   <Criterion Field="" Keys="" Regex="" Match="" Basevalue=""
    DataType="" />
  </MatchingCriteria>
  <CorrelationKeys>
   <KeyItem Field="Detail" Keys="" Regex=""/>
   <KeyItem Field="Detail" Keys="" Regex=""/>
  </CorrelationKeys>
 </ErrorItem>
</ErrorModel>
```

The error model includes a collection of error items. Each error item has a type that acts as an identifier for the error, and a level to indicate the severity of the error. The error item contains a list of error matching criteria to determine whether an error matches the model, and a list of key items to help extract correlation keys from the error itself. The attributes Field, Keys, and Regex are used to extract information from the error log.

The third type of model is a performance metric model. The application health is normally represented by a set of performance metrics. Constant monitoring of these metrics can potentially detect issues at their early stage. As certain anomalies are detected, it is useful to trace down the root cause of these issues. The framework provides a solution to automate this process. The following description takes the system availability (high availability is one of the goals in distributed systems) as an example. The model defines three thresholds: Soft, Hard, and Duration. Each threshold has a base value and a comparison method. The "Soft" is the bound that indicates that a metric is not normal but as long as it returns to normal within the period constrained by the "Duration" threshold, it is still okay. The "Hard" is the bound beyond which a metric cannot correctly go. These three thresholds define two types of availability anomaly: long duration anomaly (the availability is between "Soft" and "Hard", and lasts for a time period longer than "Duration") and severe anomaly (the availability is less than "Hard"). A sample performance metric model follows.

```
<!--model for system availability-->
<MetricModel Name="Availability">
<Thresholds>
<Threshold Name="Soft" Value="0.95" Compare="LessThan"/>
<Threshold Name="Hard" Value="0.7" Compare="LessThan"/>
<Threshold Name="Duration" Value="500" Compare="GreaterThan"/>
</Thresholds>
</MetricModel>
```

Data Structures

The following paragraphs describe three types of data inside the model checking system: TraceRecord, StateInfo, and McEvent (model checking event). Any system behavior will be eventually converted into the format of a TraceRecord by the trace management component. An example definition of the TraceRecord follows.

```
public class TraceRecord : IDisposable
{
    private Dictionary<string, object> m_table = new Dictionary<string, object>( );
}
```

TraceRecord is a collection of property and context objects. It is the responsibility of the trace management component to convert the trace from its original format to a TraceRecord. The trace management component may include one or more trace readers for extracting trace information from various trace sources. The reader provides a property named "TimeStamp" whose context is the time flag when the event actually happened. Although the timestamp is not reliable in a distributed application due to machine clock shift, the ordering on a single node is still valid.

The model checking component takes the TraceRecord as input and converts data into another format named StateInfo, which contains four properties that are used to check the state of a variable: 1) VariableId: a unique identifier of the variable to be monitored, 2) State: the current state information for the variable, 3) CorrelationId: the information that can be used to correlate with other variables, and 4) TimeFlag: the timestamp when the variable transits into the current state. An example definition of the StateInfo follows.

```
public class StateInfo
{
    public PropertyContextCollection VariableId { get; set; }
    public object State { get; set; }
    public PropertyContextCollection CorrelationId { get; set; }
    public DateTime TimeFlag { get; set; }
}
```

Each checker owns a model for a particular variable and the corresponding checker configuration. The conversion from TraceRecord to StateInfo is done based on the configuration as shown in the following, where the mapping between the four properties of StateInfo and the fields of TraceRecord is explicitly specified.

```
<ModelChecker Name="FsmModelName">
<Config
    SrcTbl="SoureTableName"
    Reader="ReaderName"
VariableIdFields="Field1:Field2"
CorrelationIdFields="Field3:Field4:Field5"
    StateField="State"
    StateRegex=""
    StateType="Double"
    TimeFlagField="TimeFlag"
    BaseQueryDuration="10"/>
</ModelChecker>
```

As the model checking component processes the states in an individual state machine, the component will create and throw events into an event pool based on the event dependency graph. An event could be a state or state transition in FSMs, an error, or an anomaly in the performance metrics. Each event has a type (description of the event), an EventID (a unique identifier), a set of properties to correlate with other events (CorrelationKey), the correlation status with its correlated parent (causing event) and child (resulting event) (ParentCorrStatus and ChildCorrStatus), and the timestamp when the event happens (TimeStamp). An example definition of the McEvent follows.

```
public class McEvent
{
    public McEventType EventType { get; set; }
    public Guid EventId { get; set; }
    public PropertyContextCollection CorrelationKey { get; set; }
    public Dictionary<McEventType, bool> ParentCorrStatus { get; set; }
    public Dictionary<McEventType, bool> ChildCorrStatus { get; set; }
    public DateTime TimeStamp { get; set; }
}
public class McEventType
{
    public string Host { get; set; }
    public object CurrentState { get; set; }
    public object PreviousState { get; set; }
}
```

System Components

Figure 1:
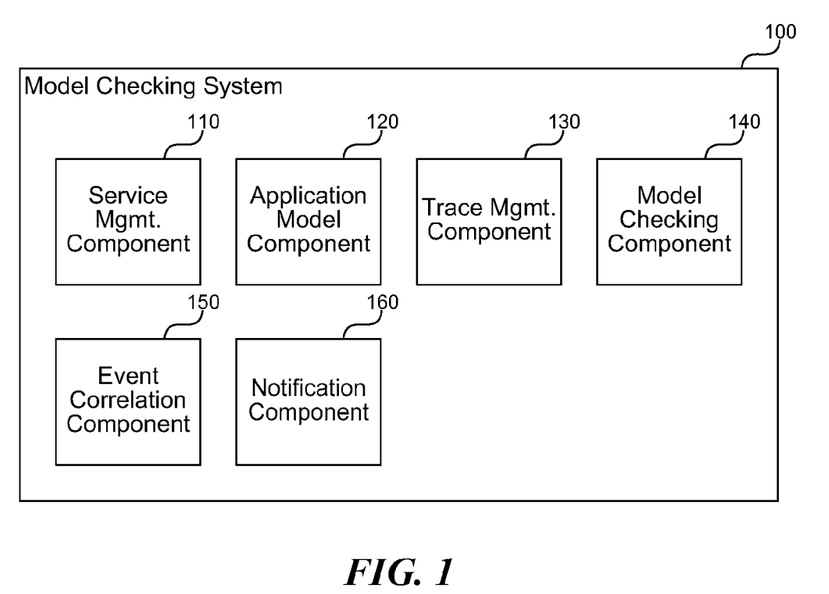
FIG. 1 is a block diagram that illustrates components of the model checking system, in one embodiment.

FIG. 1 is a block diagram that illustrates components of the model checking system, in one embodiment. The system 100 includes a service management component 110, an application model component 120, a trace management component 130, a model checking component 140, an event correlation component 150, and a notification component 160. Each of these components is described in further detail herein.

The service management component 110 manages model checking by starting, stopping, pausing, and resuming a model checking service. For example, the component 110 may issue commands to each of the other components to initialize and prepare for or resume model checking, or to shut down or pause model checking.

The application model component 120 manages one or more models of the distributed application, wherein the models describe invariant behavior of the distributed application. The component 120 loads or updates the application models from a data store or other storage facility. The component 120 can also enable and disable certain models based on service configuration changes. For example, a tester may disable a model reporting too many false positives until the model can be updated.

The trace management component 130 controls a collection of trace readers to load traces from various resources associated with the distributed application. The component may read information from one or more log files, databases, directly from a service by querying the service, and so on. The component 130 uses trace readers to bridge domain specific input formats into a common format understandable by the model checking system 100.

A trace reader is a component that loads traces from various sources and converts them into the TraceRecord structure used by the model checkers. If a new data source is added, a corresponding reader can be provided to the system. In some embodiments, trace readers inherit from an interface ITraceReader and implement the following two methods:

---

List<TraceRecord> Read(ReaderConfig readerConfig, ConfigRecord serviceConfig, ref object lastProcessedId, DateTime startLogTimeStamp, Guid tag);
List<TraceRecord> ReadLatestTransitions(ReaderConfig readerConfig, ConfigRecord serviceConfig, List<string> keys, TraceRecord record, Guid tag);

---

The first method is used by the model checking system to continuously load data for processing. It takes both the reader configuration and the service configuration as arguments. The reader configuration contains information about the data source, the reader name, and the timestamp field. The service configuration defines how to load the trace such as the number of logs processed per query. The "lastProcessedId" is the timestamp of the last trace record that has been read by the reader. The "startLogTimeStamp" is used to determine the starting point of logs when the service is started but no history information has been saved. The second method is used when an error is detected and the service attempts to load all correlated traces into a single place to facilitate investigation. The "record" is the current problematic record under check. The "keys" list is a set of constraints when querying the correlated traces.

The model checking component 140 manages a collection of model checkers to learn and verify behavior of the distributed application. The component starts different checkers and assigns each checker a particular model, and loads the corresponding checker configuration. The distributed application may execute normally or be subjected to one or more test scenarios. As the application executes, the model checking component 140 monitors various components of the distributed application for anomalies. If an unexpected event occurs, or a property is detected to vary from the invariant behavior expected by the model, then the component 140 reports an event (sometimes called a counter example) for further investigation.

The model checking component 140 plays two roles: model learner and checker. When the service is running in the learning mode, the component 140 starts with an empty or incomplete model. The component 140 extracts information from the trace record and remembers the variables first seen. As the logs are processed, the component 140 gradually builds up the application model until no new information can be extracted from the logs. In the checking mode, the component 140 validates the application behaviors with respect to the models that have been learned. Using the FSM as an example, the component 140 will monitor the actual application state transitions and verify whether the transitions are valid, and if the duration the application stays in each state is within bounds. Each model checker managed by the component 140 remembers the last seen state for the state machine.

The event correlation component 150 correlates events across the application, and conducts root cause analysis. Events can include violations of one or more models indicated by particular log entries, performance metrics, or other occurrences. The component 150 uses a predefined event dependency graph that defines interactions between independent and/or distributed application components. The component 150 may identify each action taken with respect to the system with a particular identifier so that results of actions can be traced from component to component.

To perform correlation, the system builds a dependency relationship. The model and the corresponding class definition are given in the following. In this example, the parent event is a state transition from S1 to S2 in FSM "Model1." This will trigger a transition to state S3 for FSM described by "Model2." The set of correlation key types are "Key1" and "Key2."

---

<Dependency>
<ParentEvent Host="Model1" State="S1:S2" />
<DependentEvent Host="Model2" State="S3" />
<CorrelationKey value="Key1:Key2" />
<Statistics>
</Statistics>
</Dependency>
public class McEventDependency
{
    public McEventType Parent { get; set; }
    public McEventType Child { get; set; }
    public List<string> KeyTypes { get; set; }
}

---

The event correlation component 150 continuously scans the event pool. For each event, the component 150 tries to find the correlated causing and resulting (parent and child) events. Since the events are coming from different nodes and processed by different checkers, event reordering becomes a common scenario where the causing event may show up in the pool after the resulting event. To mitigate this issue, each checker reports checking progress in terms of the timestamp of the last processed record (referred to as a checkpoint). The component 150 will check the progress of a certain checker to determine whether the event should have arrived at the pool. In some embodiments, the component 150 assumes: 1) that clock shift across machines will not be greater than a threshold, and 2) the causing event happens no later than the resulting event. This simplifies processing by the component 150.

The notification component 160 provides reports and alerts that identify unexpected application behavior identified by model checking. The model checking system 100 takes various formats of trace as input and outputs alerts if an anomaly is detected. The component 160 may also provide detailed checking reports upon request or periodically as part of routine monitoring of the distributed application.

The computing device on which the model checking system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Processing Pipeline

In some embodiments, the model checking system can run in two modes: learning and checking. In the learning mode, the service has full trust in the logs and learns different models from them. A one-time manual review can be used after the models are obtained to correct any model errors that do not comply with the original application design. In checking mode, the model checkers fetch the trace records from a trace queue that is populated by the trace readers and then check the records against the application models. The checkers will throw events into the event pool if they detect any event that has a dependency relationship with other events described by the event dependency graph. The event correlation component continuously goes through the event list and tries to find the causing and resulting events for any target event. Both the model checkers and the event correlation component will report an error along with the related traces if the actual application behaviors do not comply with the properties defined in the models. Human investigation can then determine whether the error is a false alarm. If it is a false alarm, the investigator can update the model. This can be done manually or by running the service in learning mode.

Figure 2:
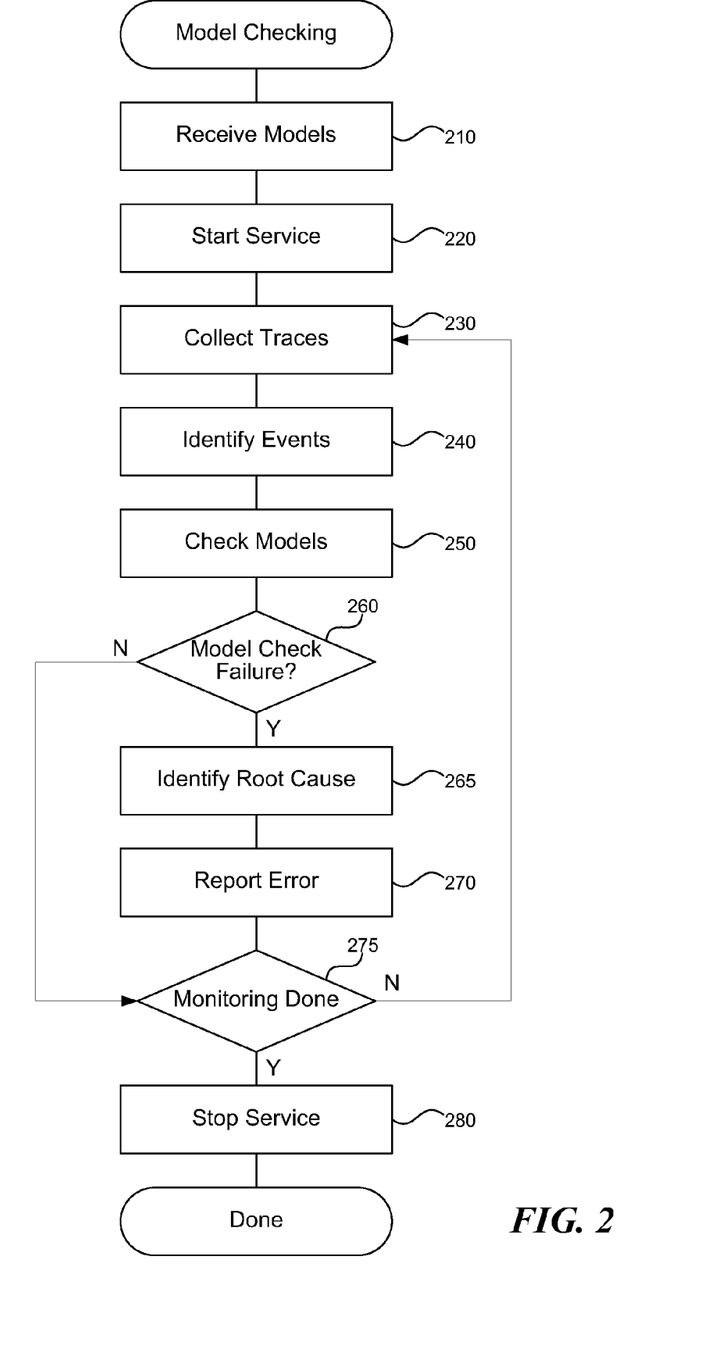
FIG. 2 is a flow diagram that illustrates processing of the model checking system to execute a distributed application with model checking, in one embodiment.

FIG. 2 is a flow diagram that illustrates processing of the model checking system to execute a distributed application with model checking, in one embodiment. Beginning in block 210, the system receives one or more models that describe expected behavior of the distributed application. The models may include one or more invariant properties of the application, such as finite state machines, errors, and performance metrics. In some embodiments, the system models each component of the application as a finite state machine and builds a dependency graph to track dependencies between components. The models, if correct, define behavior the application will exhibit when the application is behaving correctly. Sometimes models evolve on an ongoing basis. For example, testing may discover that the application is behaving correctly when an error is reported because the model is incorrect. In such cases, a tester may run the system in a learning mode or manually update the model to reflect the correct behavior of the application.

Continuing in block 220, the system starts a model checking service that monitors execution of the distributed application to detect abnormal behavior of the application. For example, the service may start one or more trace loaders that watch components of the application for output information that describes occurrences within the application. Trace loaders may monitor log files, databases, and other sources of information for status of the application.

Continuing in block 230, the system collects one or more traces that describe behavior of the application as a series of one or more events that occur at distributed components of the application. For example, the system may collect log files and other trace information to an aggregated central location for processing. Processing of traces may occur offline, after the application has stopped running to asynchronously detect unexpected application behavior. The system can also dynamically identify application behavior.

Continuing in block 240, the system identifies one or more events based on the collected traces. The system may correlate events to identify events that stem from the same action within the application. For example, a request to store data in a distributed storage application may result in many actual events within the application, such as database queries, received web requests, file system accesses, and so forth. The system correlates related events so that if unexpected application behavior is identified, a chain of events can be traced back to the root cause of the failure.

Continuing in block 250, the system checks the received one or more models against the identified events to determine whether any unexpected application behavior has occurred. For example, the system may identify state transitions that violate the model, errors that do not occur if the application is behaving correctly, and performance metrics that are outside of allowable bounds.

Continuing in decision block 260, if a model check fails, then the system continues at block 265, else the system continues at block 275. Continuing in block 265, the system identifies a root cause event related to the failed model check. For example, the system may navigate a chain of events correlated with an event that failed the model check. When a root event is found, the root event is identified as the root cause and the chain of correlated events is stored for later analysis. Continuing in block 270, the system reports an error based on the identified root cause and failed model check. The system may send the report to a person for manual analysis and updating of the model or fixing of a bug in the application software code. The error report may identify information helpful to the analysis, such as when the event occurred, which application components were involved, each correlated event involved with the failure, and so forth.

Continuing in decision block 275, if monitoring of the application is complete, then the system continues at block 280, else the system loops to block 230 to continue collect trace information. In some cases, model checking is performed on traces after the application has run. Continuing in block 280, the system stops the model checking service. The system may stop in response to a user command or expiration of a preset monitoring duration. After block 280, these steps conclude.

Figure 3:
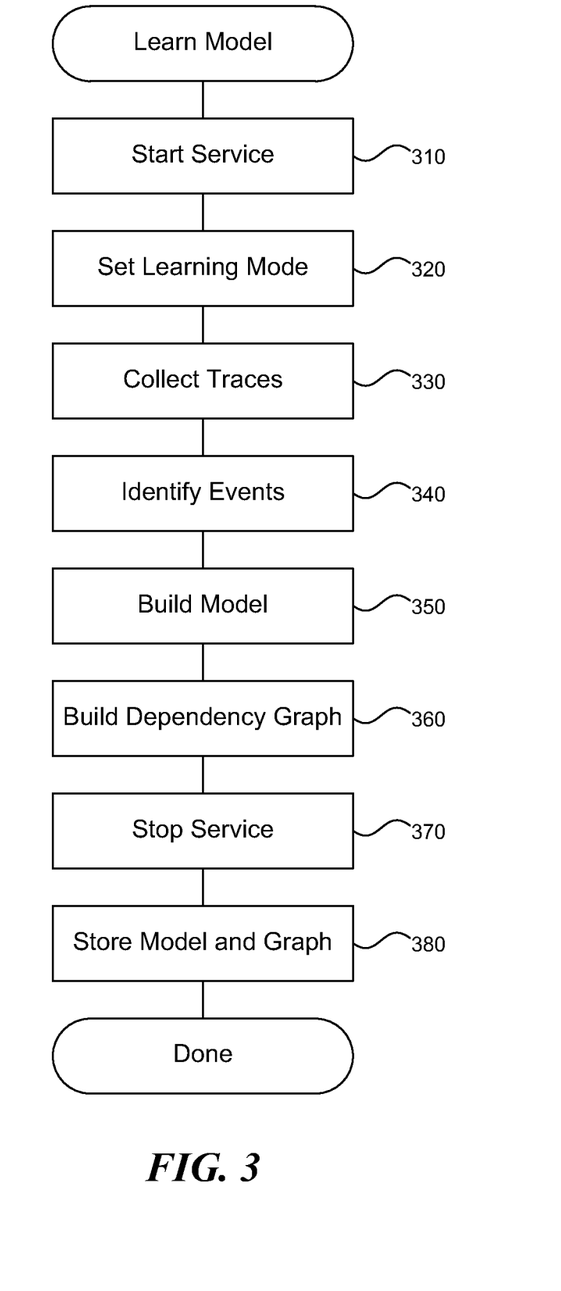
FIG. 3 is a flow diagram that illustrates processing of the model checking system to learn one or more models for distributed application behavior, in one embodiment.

FIG. 3 is a flow diagram that illustrates processing of the model checking system to learn one or more models for distributed application behavior, in one embodiment. Beginning in block 310, the system starts a model checking service that monitors execution of the distributed application to learn behavior of the application. For example, the service may start one or more trace loaders that watch components of the application for output information that describes occurrences within the application. Trace loaders may monitor log files, databases, and other sources of information for status of the application. The system may assume during learning that the received output is correct for purposes of creating a model of application behavior.

Continuing in block 320, the system sets a learning mode of the model checking service that detects application behavior to build a model of correct behavior for the application. For example, the service may receive one or more configuration parameters, and one parameter may specify the mode in which the service runs.

Continuing in block 330, the system collects one or more traces that describe behavior of the application as a series of one or more events that occur at distributed components of the application. For example, the system may collect log files and other trace information to an aggregated central location for processing. Processing of traces may occur offline, after the application has stopped running to asynchronously learn application behavior. The system can also dynamically identify application behavior. Continuing in block 340, the system identifies one or more events based on the collected traces. The system may correlate events to identify dependencies between components of the application for building a dependency graph. For example, a request to store data in a distributed storage application may result in many actual events within the application, such as database queries, received web requests, file system accesses, and so forth.

Continuing in block 350, the system builds a model of one or more components of the application, wherein the model describes correct behavior of each component. For example, the system may build a finite state machine that represents each component and the valid states and transitions that the component can undergo. Continuing in block 360, the system builds a dependency graph that describes one or more interactions between components of the application. For example, the system may build a graph that relates the finite state machines modeling each component. The dependency graph describes how components are interrelated and what events can occur between components of the application.

Continuing in block 370, the system stops the model checking service. The system may stop in response to a user command, a configuration parameter change, or expiration of a preset monitoring duration. Continuing in block 380, the system stores the built model and dependency graph. The system can later run in a checking mode, and load the model and graph to verify correct application behavior under a variety of loads and circumstances. After block 380, these steps conclude. Allowing the system to learn application behavior allows testers to quickly apply the system to new applications without deep understanding of the system or manually building models. The system can be up and running quickly to inform testers when the application is behaving in an unusual or not before seen way.

In some embodiments, the model checking system verifies behavior of third party application components. Complex applications often utilize many components, some off the shelf or third party components that are not under the application developer's control. Nevertheless, correct behavior of the application may depend on correct behavior of the third party components, and the model checking system can receive a model for third party components and verify behavior of those components during model checking. The learning function of the model checking system allows the system to learn a model of well-understood behavior for the third party components and to report on any behavior that deviates from the learned model.

In some embodiments, the model checking system performs model checking offline. Some applications may generate a large number of logs as they run or may be difficult to monitor in real time for other reasons. The model checking system can perform a post-mortem analysis on execution of the application to verify that application behavior is in line with a model of expected behavior, long after the application has run. The system can work through logs overnight or at other convenient times to provide reports on any suspicious application behavior. In some uses of the system, an operator may run the system at its own pace over all of the traces produced by an application. Once the application is declared correct up to a certain point, traces up to that point may be discarded, leaving only new traces yet to be processed or traces that reveal erroneous application behavior.

In some embodiments, the model checking system assigns an activity identifier to high-level actions within the application and stamps events within the application using the activity identifier. Because time stamps and other types of tracing can be unreliable for event correlation, the activity identifier provides a single quantity that stays consistent across events related to the same action and that the system can use to correlate events across application components.

As noted herein, the model checking system consumes models that specify application abnormal or even expected invariants. For example, even seemingly correct application behavior can signal an application bug if the behavior happens too frequently. A reconfiguration may be a normal occurrence, but a certain number of reconfigurations in a single period may indicate a problem. This type of behavior can be described in a model and monitored by the system to signal someone if the behavior occurs.

From the foregoing, it will be appreciated that specific embodiments of the model checking system have been described herein for purposes of illustration, but that various modifications may be made without deviating from the spirit and scope of the invention. Accordingly, the invention is not limited except as by the appended claims.

We claim:

1. A computer-implemented method for executing a distributed application and verifying correctness of distributed system behavior, the method comprising:

receiving a plurality models that collectively describe expected behavior of the distributed application, wherein the plurality of models are generated by monitoring the distributed application in a learning mode and wherein one or more of the plurality of models are further updated in the learning mode upon determination that an error reported was an erroneous error, wherein receiving the plurality models comprises receiving one or more invariant properties of the distributed application, wherein the plurality of models comprises at least one of a finite state machines (FSM) model representing an individual machine in the distributed application, wherein each FSM includes statistics for verification for each state in the FSM, an error model describing at least one stable property of the distributed application, the error model further comprising an error type identifier, an error severity indicator and a key item for extracting correlation keys for event correlation and a performance metric model, the performance metric model comprises a hard bound threshold beyond which performance statistics cannot go or a soft bound threshold beyond which performance statistics cannot stay over a set period of time, the plurality of models further comprising a dependency graph that correlates events among the plurality of models;

starting a model checking service online or offline that monitors execution of the distributed application to detect behavior of the application without inserting annotations into the distributed application;

collecting one or more traces that describe behavior of the application as a series of one or more events that occur at distributed components of the application;

identifying one or more events based on the collected traces;

checking the received plurality of models against the identified events to determine whether any unexpected application behavior has occurred wherein the unexpected behavior is selected from a group consisting of state transitions that violate one of the FSM models, an error specified by one of the error models or a violation of one of the performance metric models; and upon determining that a model check failed by identifying events correlated to the unexpected behavior in the dependency graph, identifying a root cause event related to the failed model check; and reporting an error based on the identified root cause and failed model check, wherein the preceding steps are performed by at least one processor.

2. The method of claim 1 wherein receiving the one or more models comprises receiving one or more invariant properties of the distributed application in a form selected from the group consisting of finite state machines, errors, and performance metrics.

3. The method of claim 1 wherein receiving the one or more models comprises receiving a finite state machine that models each component of the application and a dependency graph that models dependencies between components.

4. The method of claim 1 wherein starting the model checking service comprises starting one or more trace loaders that watch components of the application for output information that describes occurrences within the application.

5. The method of claim 1 wherein collecting one or more traces comprises collecting log files and aggregating to a central location for processing.

6. The method of claim 1 wherein identifying one or more events comprises correlating events to identify events that stem from the same action within the application, such that if unexpected application behavior is identified, a chain of events can be traced back to the root cause of the failure.

7. The method of claim 1 wherein checking the models comprises identifying a state transition that violates the model and reporting a model violation to a user.

8. The method of claim 1 wherein checking the models comprises identifying an error that does not occur if the application is behaving correctly, and reporting a model violation to a user.

9. The method of claim 1 wherein checking the models comprises identifying a performance metric that is outside of a predetermined threshold, and reporting a model violation to a user.

10. The method of claim 1 wherein identifying a root cause event comprises navigating a chain of events correlated with an event that failed the model check, and wherein identifying the root cause event includes identifying correlation keys which do not rely on physical clock time on the machines where the distributed application runs.

11. The method of claim 1 wherein reporting the error comprises sending a report to a person for manual analysis and updating of the model or fixing of a bug in the application software code.

12. The method of claim 1 further comprising, upon determining that monitoring of the application is complete, stopping the model checking service.

13. A computer system for model checking for distributed application validation, the system comprising:
a processor and memory configured to execute software instructions embodied within the following components;
a service management component configured to manage model checking by starting, stopping, pausing, and resuming a model checking service;
an application model component configured to manage a plurality of models of the distributed application, wherein the models describe invariant expected behavior of the distributed application, wherein the plurality of models comprises at least one of a finite state machines (FSM) model representing an individual machine in the distributed application, wherein each FSM includes statistics for verification for each state in the FSM, an error model describing at least one stable property of the distributed application, the error model further comprising an error type identifier, an error severity indicator and a key term for extracting correlation keys for event correlation and a performance metric model, the performance metric model comprises a hard bound threshold beyond which performance statistics cannot go or a soft bound threshold beyond which performance statistics cannot stay over a set period of time, the plurality of models further comprising a dependency graph that correlates events among the plurality of models;
a trace management component configured to control a collection of trace readers to load traces from various resources associated with the distributed application;
a model checking component configured to manage a collection of model checkers, the collection of model checkers configured to automatically learn and verify behavior of the distributed application by checking the plurality of models for unexpected behavior wherein the unexpected behavior is selected from a group consisting of state transitions that violate one of the FSM models, an error specified by one of the error models or a violation of one of the performance metric models;
an event correlation component configured to correlate events across the application and conduct root cause analysis to identify a root cause event by identifying events correlated to the unexpected behavior; and
a notification component configured to provide one or more reports and alerts that identify unexpected application behavior identified by model checking.

14. The system of claim 13 wherein the application model component is further configured to load or update the application models from a data store.

15. The system of claim 13 wherein the trace management component is further configured to one or more log files or databases and invoke the trace readers to bridge domain specific input formats into a common format.

16. The system of claim 13 wherein the model checking components is further configured to starts different checkers, assign each checker a particular model, and load a corresponding checker configuration.

17. The system of claim 13 wherein the model checking components is further configured to, as the application executes, monitor components of the distributed application for unexpected application behavior that violates one or more invariant properties specified by a model.

18. The system of claim 13 wherein the model checking components is further configured to receive configuration information that selects between a learning mode for building a model of the application and a validation mode for verifying that application behavior matches one or more models.

19. The system of claim 13 wherein the event correlation component is further configured to load a predefined event dependency graph that defines interactions between distributed application components.

\* \* \* \* \*